United States Patent
D'Oro et al.

(10) Patent No.: US 12,489,690 B2
(45) Date of Patent: Dec. 2, 2025

(54) OPEN RAN ADAPTER FOR USE OF OPEN RAN TECHNOLOGIES ON LEGACY RAN SYSTEMS

(71) Applicant: Northeastern University, Boston, MA (US)

(72) Inventors: Salvatore D'Oro, Brookline, MA (US); Leonardo Bonati, Boston, MA (US); Michele Polese, Cambridge, MA (US); Tommaso Melodia, Newton, MA (US)

(73) Assignee: Northeastern University, Boston, MA (US)

( * ) Notice: Subject to any disclaimer, the term of this patent is extended or adjusted under 35 U.S.C. 154(b) by 35 days.

(21) Appl. No.: 18/392,480

(22) Filed: Dec. 21, 2023

(65) Prior Publication Data

US 2024/0235960 A1    Jul. 11, 2024

Related U.S. Application Data

(60) Provisional application No. 63/437,629, filed on Jan. 6, 2023.

(51) Int. Cl.
*H04L 41/5009* (2022.01)
*H04L 41/06* (2022.01)

(52) U.S. Cl.
CPC .......... *H04L 41/5009* (2013.01); *H04L 41/06* (2013.01)

(58) Field of Classification Search
None
See application file for complete search history.

(56) References Cited

U.S. PATENT DOCUMENTS

| | | | |
|---|---|---|---|
| 2021/0258866 A1* | 8/2021 | Chou | H04W 48/16 |
| 2022/0038902 A1* | 2/2022 | Mueck | H04W 12/108 |
| 2022/0232423 A1* | 7/2022 | Thyagaturu | H04W 28/10 |
| 2023/0388844 A1* | 11/2023 | Dent | H04W 28/0215 |
| 2024/0098565 A1* | 3/2024 | Curic | H04W 28/0958 |
| 2024/0106709 A1* | 3/2024 | Shete | H04L 41/0895 |
| 2024/0111594 A1* | 4/2024 | Ravindran | H04L 41/0823 |
| 2024/0155393 A1* | 5/2024 | Han | H04W 24/10 |
| 2024/0205748 A1* | 6/2024 | Palapati | H04W 28/086 |

* cited by examiner

*Primary Examiner* — Ranodhi Serrao
(74) *Attorney, Agent, or Firm* — Verrill Dana, LLP (57) ABSTRACT

Provided herein are open radio access network (Open RAN) adapters for using non-open RAN nodes in a wireless network having Open RAN infrastructure, the Open RAN adapters including one or more control application programming interfaces (Control APIs) for controlling the non-open RAN nodes, one or more Data Capture APIs for capturing operational data from the non-open RAN nodes, one or more Open RAN interfaces for communication between the Open RAN adapter and the Open RAN infrastructure and one or more software modules each configured to translate data received via the Data Capture APIs to Open RAN compatible data for use by the Open RAN infrastructure and/or translate Open RAN commands received via the Open RAN interfaces to non-open RAN compatible commands for instantiation at one or more of the non-open RAN nodes via the Control APIs.

20 Claims, 6 Drawing Sheets

OPEN RAN ADAPTER FOR USE OF OPEN RAN TECHNOLOGIES ON LEGACY RAN SYSTEMS

CROSS REFERENCE TO RELATED APPLICATIONS

This application claims benefit under 35 U.S.C. § 119(e) of U.S. Provisional Application No. 63/437,629, filed on 6 Jan. 2023, entitled "O-RAN Adapter for Use of Open RAN Technologies on Legacy RAN Systems," the entirety of which is incorporated by reference herein.

BACKGROUND

Open RAN technologies embrace the 3GPP functional split where traditionally monolithic base stations of the Radio Access Network (RAN) are disaggregated into software-based Centralized Units (CUs), Distributed Units (DUs) and Radio Units (RUs) implementing different functions of the protocol stack. Open RAN also introduces (i) a set of open standardized interfaces to interact (E2, A1), control (E2, A1) and collect data (O1) from every node of the network; as well as (ii) RAN Intelligent Controllers (RICs) that execute third-party applications over an abstract overlay to control RAN functionalities, i.e., xApps in the near-real-time (or near-RT) and rApps in the non-real-time (or non-RT) RIC. Such Open RAN architecture makes it possible to bring automation and intelligence to the network through A1, which will leverage the enormous amount of data generated by the RAN, and exposed through the Open RAN interfaces, to analyze the current network conditions, forecast future traffic profiles and demand, and implement closed-loop network control strategies to optimize the RAN performance.

However, the rollout of Open RAN architectures is expected to be gradual, and for several years Open RAN technologies will coexist with legacy RAN deployments. This coexistence will force telecom operators and infrastructure owners to maintain old management and control solutions (e.g., self-organizing networks (SON) platforms) for the legacy RAN portion of the network, which will result in high licensing fees and expenses that will be necessary until the entirety of the legacy RAN has been discontinued.

SUMMARY

Described herein are Open RAN adapters for the use of Open RAN technologies in connection with Legacy RAN Systems. The present technology provides a solution designed to support the instantiation, use and execution of Open RAN technologies (e.g., RIC, E2 and O1 interfaces, xApps, rApps, among others) on network deployments where some (or all) RAN components (e.g., 5G gNBs and 4G eNBs) are not compliant to Open RAN specifications and are not natively following Open RAN principles. Thus, the present technology permits operators to leverage new-generation Open RAN control frameworks (e.g., Service and Management Orchestration (SMO) and Radio Access Network (RAN) Intelligent Controller (RIC) platforms) over legacy RAN deployments, thus supplanting the expensive and old legacy control and management frameworks (e.g., SON) while benefiting from the many advantages brought by Open RAN technologies.

In one aspect, an open radio access network (Open RAN) adapter for using non-open RAN nodes in a wireless network having Open RAN infrastructure is provided. The Open RAN adapter includes one or more control application programming interfaces (Control APIs) for controlling the non-open RAN nodes. The Open RAN adapter also includes one or more Data Capture APIs for capturing operational data from the non-open RAN nodes. The Open RAN adapter also includes one or more Open RAN interfaces for communication between the Open RAN adapter and the Open RAN infrastructure. The Open RAN adapter also includes one or more software modules each configured to translate data received via the Data Capture APIs to Open RAN compatible data for use by the Open RAN infrastructure and/or translate Open RAN commands received via the Open RAN interfaces to non-open RAN compatible commands for instantiation at one or more of the non-open RAN nodes via the Control APIs.

In some embodiments, the Open RAN infrastructure in communication with the Open RAN adapter via the Open RAN interfaces includes at least one of a near-real time (near-RT) RAN intelligent controller (RIC), a non-RT RIC, and/or a service management and orchestration platform (SMO) of the Open RAN. In some embodiments, the one or more software modules include a function mapping module for determining a list of available functionalities of at least one of the non-open RAN nodes. In some embodiments, the function mapping module includes a function adapter for determining a list of functionalities of at least one of the one or more non-open RAN nodes and mapping the determined list of functionalities of each corresponding non-open RAN node to a list of Open RAN functionalities. In some embodiments, the function mapping module includes a function registry configured to store each mapped list of Open RAN functionalities for each corresponding non-open RAN node. In some embodiments, the functionalities each include at least one of a control functionality, a management functionality, a monitoring functionality, or combinations thereof. In some embodiments, the one or more software modules include a KPI mapping module for converting KPI reports generated by the non-open RAN nodes to Open RAN KPI reports. In some embodiments, the KPI mapping module includes a KPI adapter for determining a list of KPIs of at least one of the one or more non-open RAN nodes and mapping the determined list of KPIs of each corresponding non-open RAN node to a list of Open RAN KPIs. In some embodiments, the kpi mapping module includes a KPI registry configured to store each mapped list of Open RAN KPIs for each corresponding non-open RAN node. In some embodiments, the one or more software modules include an event mapping module for converting event reports generated by the non-open RAN nodes to Open RAN event reports. In some embodiments, the event mapping module includes an event adapter for determining a list of event reports of at least one of the one or more non-open RAN nodes and mapping the determined list of event reports of each corresponding non-open RAN node to a list of Open RAN event reports. In some embodiments, the event mapping module includes an event report registry configured to store each mapped list of Open RAN event reports for each corresponding non-open RAN node.

In some embodiments, the one or more software modules, along with the Control APIs, are configured to permit the Open RAN adapter to control the non-open RAN nodes to emulate the execution of one or more xApps and/or rApps. In some embodiments, the Open RAN adapter is configured to interact with one or more of the non-open RAN nodes at a control plane using Control APIs configured to directly interface with the one or more of the non-open RAN nodes. In some embodiments, the Open RAN adapter is configured to interact with one or more of the non-open RAN nodes at a control plane via an element management system (EMS) using Control APIs configured to interface with the EMS. In some embodiments, the EMS is configured to directly interface with the one or more of the non-open RAN nodes responsive to interaction with the Open RAN adapter. In some embodiments, the Open RAN adapter is configured to access data of one or more of the non-open RAN nodes and/or input commands into one or more of the non-open RAN nodes via direct or indirect interaction with a command line interface of at least one of the non-open RAN nodes. In some embodiments, the Open RAN adapter includes a data lake, accessible by the Data Capture APIs, configured to continuously store data generated by the non-open RAN nodes. In some embodiments, the one or more Open RAN interfaces are configured to permit the Open RAN adapter to emulate at least one of an E2 interface, an O1 interface, or combinations thereof. In some embodiments, the one or more Open RAN interfaces include one Open RAN interface configured to emulate both the E2 interface and the O1 interface. In some embodiments, the one or more Open RAN interfaces include a first Open RAN interface configured to emulate the E2 interface. In some embodiments, the one or more Open RAN interfaces include a second Open RAN interface configured to emulate the O1 interface. In some embodiments, the Open RAN adapter is deployed in a cloud. In some embodiments, the cloud includes at least one of an edge cloud, a local cloud, a cloud service, or combinations thereof. In some embodiments, the Open RAN adapter is deployed at a cell site corresponding to the one or more non-open RAN nodes.

In another aspect, a wireless network is provided. The wireless network includes an open radio access network (Open RAN) infrastructure. The wireless network also includes one or more non-open RAN nodes. The wireless network also includes an Open RAN adapter for using the non-open RAN nodes in the wireless network. The Open RAN adapter includes one or more control application programming interfaces (Control APIs) for controlling the non-open RAN nodes. The Open RAN adapter also includes one or more Data Capture APIs for capturing operational data from the non-open RAN nodes. The Open RAN adapter also includes one or more Open RAN interfaces for communication between the Open RAN adapter and the Open RAN infrastructure. The Open RAN adapter also includes one or more software modules each configured to translate data received via the Data Capture APIs to Open RAN compatible data for use by the Open RAN infrastructure and/or translate Open RAN commands received via the Open RAN interfaces to non-open RAN compatible commands for instantiation at one or more of the non-open RAN nodes via the Control APIs.

Additional features and aspects of the technology include the following:

1. An open radio access network (Open RAN) adapter for using non-open RAN nodes in a wireless network having Open RAN infrastructure comprising:
    one or more control application programming interfaces (Control APIs) for controlling the non-open RAN nodes;
    one or more Data Capture APIs for capturing operational data from the non-open RAN nodes;
    one or more Open RAN interfaces for communication between the Open RAN adapter and the Open RAN infrastructure; and
    one or more software modules each configured to translate data received via the Data Capture APIs to Open RAN compatible data for use by the Open RAN infrastructure and/or translate Open RAN commands received via the Open RAN interfaces to non-open RAN compatible commands for instantiation at one or more of the non-open RAN nodes via the Control APIs.
2. The Open RAN adapter of feature 1, wherein the Open RAN infrastructure in communication with the Open RAN adapter via the Open RAN interfaces includes at least one of a near-real time (near-RT) RAN intelligent controller (RIC), a non-RT RIC, and/or a service management and orchestration platform (SMO) of the Open RAN.
3. The Open RAN adapter of any of features 1-2, wherein the one or more software modules include a function mapping module for determining a list of available functionalities of at least one of the non-open RAN nodes.
4. The Open RAN adapter of feature 3, wherein the function mapping module includes:
    a function adapter for determining a list of functionalities of at least one of the one or more non-open RAN nodes and mapping the determined list of functionalities of each corresponding non-open RAN node to a list of Open RAN functionalities; and
    a function registry configured to store each mapped list of Open RAN functionalities for each corresponding non-open RAN node.
5. The Open RAN adapter of feature 4, wherein the functionalities each include at least one of a control functionality, a management functionality, a monitoring functionality, or combinations thereof.
6. The Open RAN adapter of any of features 1-5, wherein the one or more software modules include a KPI mapping module for converting KPI reports generated by the non-open RAN nodes to Open RAN KPI reports.
7. The Open RAN adapter of feature 6, wherein the KPI mapping module includes:
    a KPI adapter for determining a list of KPIs of at least one of the one or more non-open RAN nodes and mapping the determined list of KPIs of each corresponding non-open RAN node to a list of Open RAN KPIs; and
    a KPI registry configured to store each mapped list of Open RAN KPIs for each corresponding non-open RAN node.
8. The Open RAN adapter of any of features 1-7, wherein the one or more software modules include an event mapping module for converting event reports generated by the non-open RAN nodes to Open RAN event reports
9. The Open RAN adapter of feature 8, wherein the event mapping module includes:
    an event adapter for determining a list of event reports of at least one of the one or more non-open RAN nodes and mapping the determined list of event reports of each corresponding non-open RAN node to a list of Open RAN event reports; and
    an event report registry configured to store each mapped list of Open RAN event reports for each corresponding non-open RAN node.
10. The Open RAN adapter of any of features 1-9, wherein the one or more software modules, along with the Control APIs, are configured to permit the Open RAN adapter to control the non-open RAN nodes to emulate the execution of one or more xApps and/or rApps.

11. The Open RAN adapter of any of features 1-10, wherein the Open RAN adapter is configured to interact with one or more of the non-open RAN nodes at a control plane using Control APIs configured to directly interface with the one or more of the non-open RAN nodes.
12. The Open RAN adapter of any of features 1-11, wherein the Open RAN adapter is configured to interact with one or more of the non-open RAN nodes at a control plane via an element management system (EMS) using Control APIs configured to interface with the EMS.
13. The Open RAN adapter of feature 12, wherein the EMS is configured to directly interface with the one or more of the non-open RAN nodes responsive to interaction with the Open RAN adapter.
14. The Open RAN adapter of any of features 1-13, wherein the Open RAN adapter is configured to access data of one or more of the non-open RAN nodes and/or input commands into one or more of the non-open RAN nodes via direct or indirect interaction with a command line interface of at least one of the non-open RAN nodes.
15. The Open RAN adapter of any of features 1-14, further comprising a data lake, accessible by the Data Capture APIs, configured to continuously store data generated by the non-open RAN nodes.
16. The Open RAN adapter of any of features 1-15, wherein the one or more Open RAN interfaces are configured to permit the Open RAN adapter to emulate at least one of an E2 interface, an O1 interface, or combinations thereof.
17. The Open RAN adapter of feature 16, wherein the one or more Open RAN interfaces include one Open RAN interface configured to emulate both the E2 interface and the O1 interface.
18. The Open RAN adapter of feature 16, wherein the one or more Open RAN interfaces include:
    a first Open RAN interface configured to emulate the E2 interface; and
    a second Open RAN interface configured to emulate the O1 interface.
18. The Open RAN adapter of any of features 1-17, wherein the Open RAN adapter is deployed in a cloud.
20. The Open RAN adapter of feature 19, wherein the cloud includes at least one of an edge cloud, a local cloud, a cloud service, or combinations thereof.
21. The Open RAN adapter of any of features 1-20, wherein the Open RAN adapter is deployed at a cell site corresponding to the one or more non-open RAN nodes.
22. A wireless network comprising:
    an open radio access network (Open RAN) infrastructure;
    one or more non-open RAN nodes; and
    an Open RAN adapter for using the non-open RAN nodes in the wireless network, the Open RAN adapter including:
        one or more control application programming interfaces (Control APIs) for controlling the non-open RAN nodes;
        one or more Data Capture APIs for capturing operational data from the non-open RAN nodes;
        one or more Open RAN interfaces for communication between the Open RAN adapter and the Open RAN infrastructure; and
        one or more software modules each configured to translate data received via the Data Capture APIs to Open RAN compatible data for use by the Open RAN infrastructure and/or translate Open RAN commands received via the Open RAN interfaces to non-open RAN compatible commands for instantiation at one or more of the non-open RAN nodes via the Control APIs.

DETAILED DESCRIPTION

Described herein are Open RAN adapters for the use of Open RAN technologies in connection with legacy RAN systems (also referred to herein as "non-open RAN"). Such Open RAN adapters are configured support the instantiation, use and execution of Open RAN technologies (e.g., RIC, E2 and O1 interfaces, xApps, rApps, among others) on network deployments where some (or all) RAN components (e.g., 5G gNBs and 4G eNBs) are not compliant to Open RAN specifications and do not natively follow Open RAN principles. In brief, the present technology makes legacy RAN solutions "speak" Open RAN.

Thus, the present technology permits operators to leverage new-generation Open RAN control frameworks (e.g., Service and Management Orchestration (SMO) and Radio Access Network (RAN) Intelligent Controller (RIC) platforms) over legacy RAN deployments, thus supplanting the expensive and old legacy control and management frameworks (e.g., SON) while benefiting from the many advantages brought by Open RAN technologies.

Although shown and described in the context of a specific Open RAN architecture known as "O-RAN" and defined according to standards proposed by the O-RAN Alliance, it will be apparent in view of this disclosure that the Open RAN adapters provided herein can be deployed and used in connection with any proposed or implemented Open RAN architecture (e.g., O-RAN and/or Telecom Infra Project (TIP) architectures).

As used herein, the term "Open RAN adapters" refers to middleware software components in charge of creating an abstraction of legacy RAN nodes (e.g., eNB, gNB) and making them behave at a higher level as Open RAN-compliant nodes by emulating both O1 and E2 capabilities not offered by non-open RAN nodes. In addition, the terms "wrapper" and "adapter" are used interchangeably herein.

FIGS. 1A-1B and 2A-2B illustrate an exemplary Open RAN adapter 100, 100' as integrated with a wireless network 10 having an Open RAN infrastructure 20 and at least one legacy "non-open" RAN node 30 (e.g., a legacy cell site, base station, gNB, and/or eNB). As shown, the adapter 100 can include one or more Data Capture APIs 140 associated with the non-open RAN nodes 30 for capturing data associated with the non-open RAN nodes 30. Such Data Capture APIs 140 correspond to Data Capture APIs 34 of each non-open RAN node 30 and are generally offered by a vendor of the respective non-open RAN node 30. The Data Capture APIs 140 typically reveal data generated by the non-open RAN node 30 including, for example, real-time Key Performance Indicator (KPI) streams as well as messages and data related to control and management such as Configuration Management (CM), Resource Inventory, Fault Management (FM) and Performance Management (PM). Furthermore, with respect to capturing data from non-open RAN nodes 30, the Data Capture APIs 140 and/or the Open RAN adapter 100 more generally can be configured to interact, directly or indirectly, with a command line interface (CLI) of the non-open RAN nodes 30 to access data from the non-open RAN nodes 30.

The Open RAN adapter 100, 100' can also include one or more KPI mappers 110 (also referred to as KPI mapping modules 110) for converting KPI reports generated by the non-open RAN nodes 30 to Open RAN KPI reports. The KPI mapper 110 can include a KPI adapter 111 for determining a list of KPIs of the non-open RAN nodes 30 and mapping the determined list of KPIs of each corresponding non-open RAN node 30 to a list of Open RAN KPIs. The KPI mapper can also include a KPI registry 113 configured to store each mapped list of Open RAN KPIs for each corresponding non-open RAN node 30. In use, the KPI mapper 110 maps the KPIs exposed by the non-open RAN 30 into KPIs that follow Open RAN specifications.

Although it is to be expected that some non-open RAN nodes 30 may already use a same KPI nomenclature used by Open RAN systems (e.g., derived by 3GPP standards). However, the structure used to access such KPIs (e.g., nested NETCONF structures) in legacy systems might differ, especially from one vendor to another. The KPI mapper 110 ensures that the Open RAN adapter 100, 100' exposes a unified KPI structure to the Open RAN infrastructure 20 that is independent of vendors and specific hardware equipment. For example, the same KPI "kpi_a" can be exposed as kpi_list/kpi_a by vendor A, and measurable_kpi/kpi_class_m/kpi_a by vendor B. The KPI mapper 110 uses the KPI registry 113 to store the list of KPI as requested by Open RAN specifications and the KPI adapter to make sure that kpi_a is always represented using a unique format, e.g., kpis/kpi_a, consistent with Open RAN specifications.

The Open RAN adapter 100, 100' can also include one or more events mappers 120 (also referred to as event mapping modules 120) for converting event reports generated by the non-open RAN nodes 30 to Open RAN event reports. The events mappers 120 can include an events adapter 121 for determining a list of event reports of the non-open RAN nodes 30 and mapping the determined list of event reports of each corresponding non-open RAN node 30 to a list of Open RAN event reports. The events mappers 120 can also include an event report registry 113 configured to store each mapped list of Open RAN event reports for each corresponding non-open RAN node 30.

The events mapper 120 is configured to convert events generated by the non-open RAN nodes 30 into events that follow the Open RAN specifications. Accordingly, the event registry 121 contains the list of events that can be exposed by the non-open RAN nodes 30, and the events adapter 123 makes sure that events are exposed following a unique and vendor-agnostic representation consistent with Open RAN specifications.

The Open RAN adapter 100, 100' can also include one or more function mappers 130 (also referred to as function mapping modules 130) for determining a list of available functionalities of the non-open RAN nodes 30. The function mappers 130 can include a function adapter 131 for determining a list of functionalities of the non-open RAN nodes 30 and mapping the determined list of functionalities of each corresponding non-open RAN node 30 to a list of Open RAN functionalities. The function mappers 130 can also include a function registry 133 configured to store each mapped list of Open RAN functionalities for each corresponding non-open RAN node.

The Function mapper 130 is in configured to document control, management and monitoring functionalities exposed by the non-open RAN nodes 30 in a manner that follows the Open RAN specifications. The function mappers 130 leverage a function registry 133 to store the list of available functions and the function mapper 131 to offer an abstract view of the function nomenclature, thus making it uniform and easy to access across RAN nodes (whether open RAN or non-open RAN) from different vendors and using different naming syntax.

Still referring to FIGS. 1A-1B and 2A-2B, the adapter 100, 100' can include one or more Open RAN interfaces 101 for communication between the Open RAN adapter 100, 100' and the Open RAN infrastructure 20. The Open RAN interfaces 101 can include, for example, an O1 connector 103 for communication with a service management and orchestration platform (SMO) 21 of the Open RAN infrastructure 20 via an O1 termination 23. Thus, the O1 connector 103 can permit exchange of data and control information, including, for example, rApps, between the Open RAN adapter 100, 100' and the SMO 21 and/or modules of the SMO 21 such as, for example, a non-real time (non-RT) RAN intelligent controller (RIC) 25. The Open RAN interfaces 101 can also include, for example, an E2 agent 105 for communication with an E2 termination 24 of a near-real time (near-RT) RIC 22 of the Open RAN infrastructure 20. Thus, the E2 agent 103 can permit exchange of data and control information, including, for example, xApps 26, between the Open RAN adapter 100, 100' and the near-RT RIC 22.

At a higher level, the O1 connector 103 can generally be used to make the non-open RAN nodes 30 interact with the O1 termination 23 hosted in the SMO 21, while the E2 agent effectively converts the non-open RAN nodes 30 (e.g., gNB/eNB as shown) into Open RAN nodes that can interact with the near-RT RIC 22 over the E2 interface.

Figure 1A:
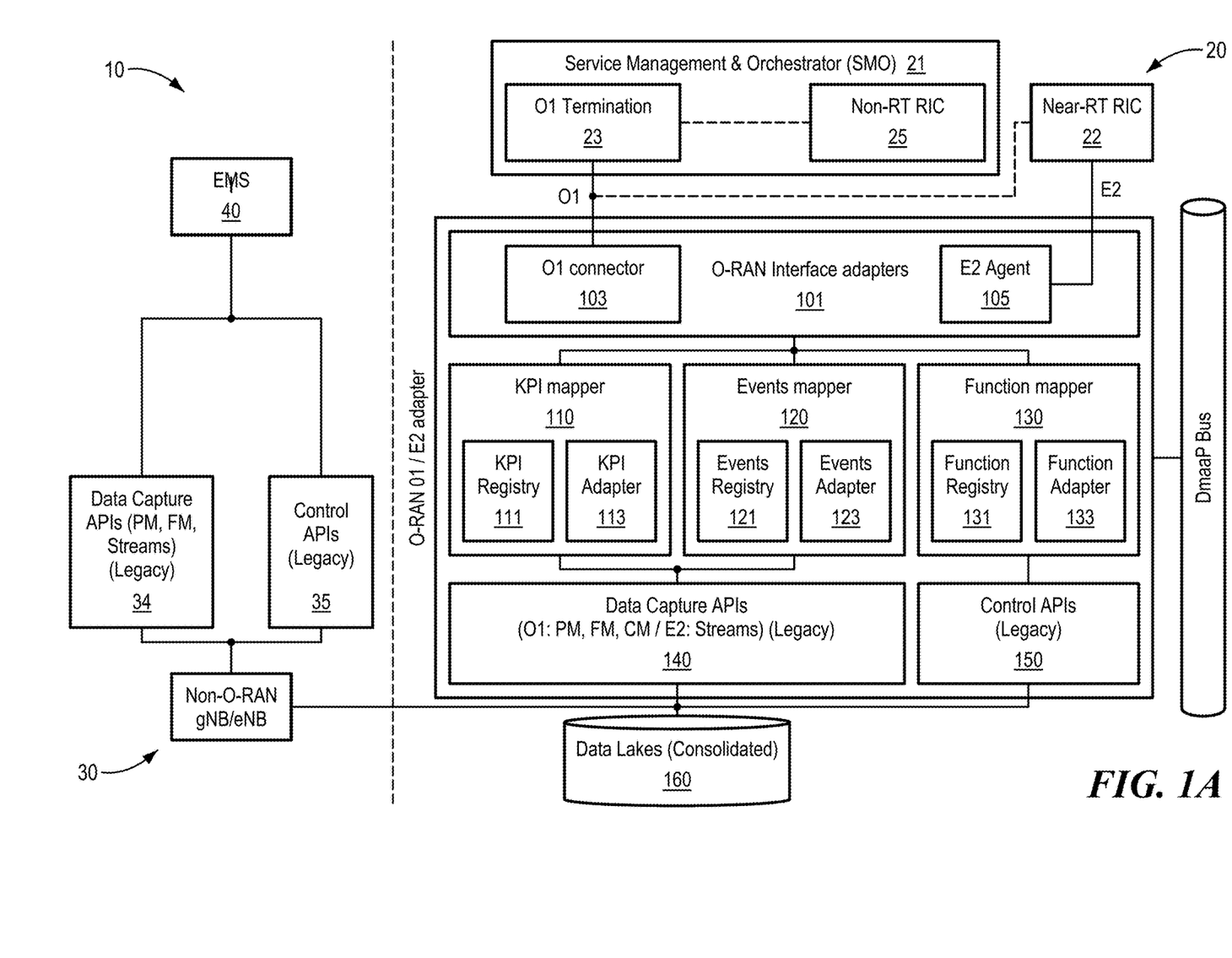
FIG. 1A illustrates a schematic diagram of a wireless network including an Open RAN adapter configured for direct control of non-open RAN nodes in accordance with various embodiments.
Figure 1B:
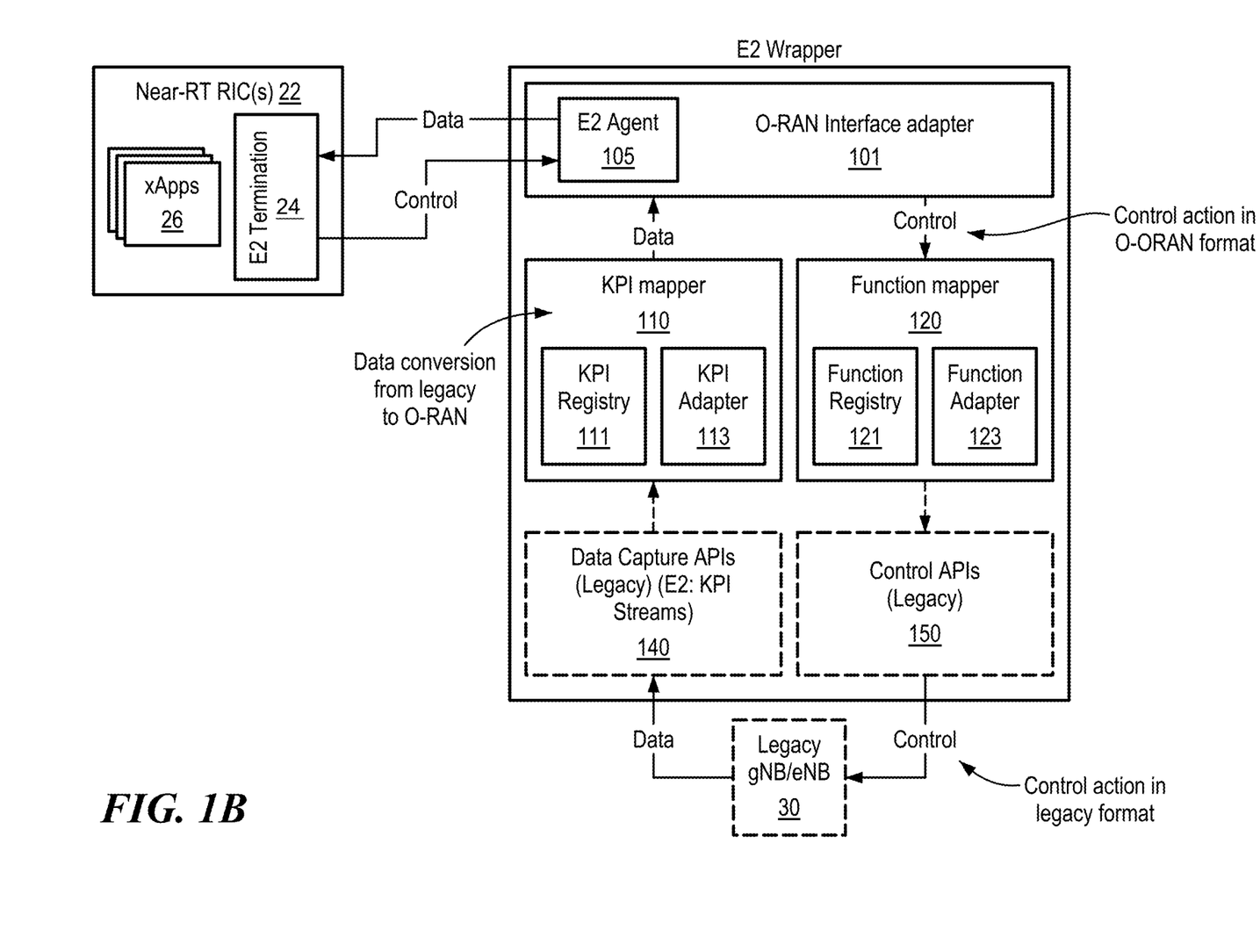
FIG. 1B illustrates a schematic diagram of E2 data flow in the wireless network of FIG. 1A.
Figure 2A:
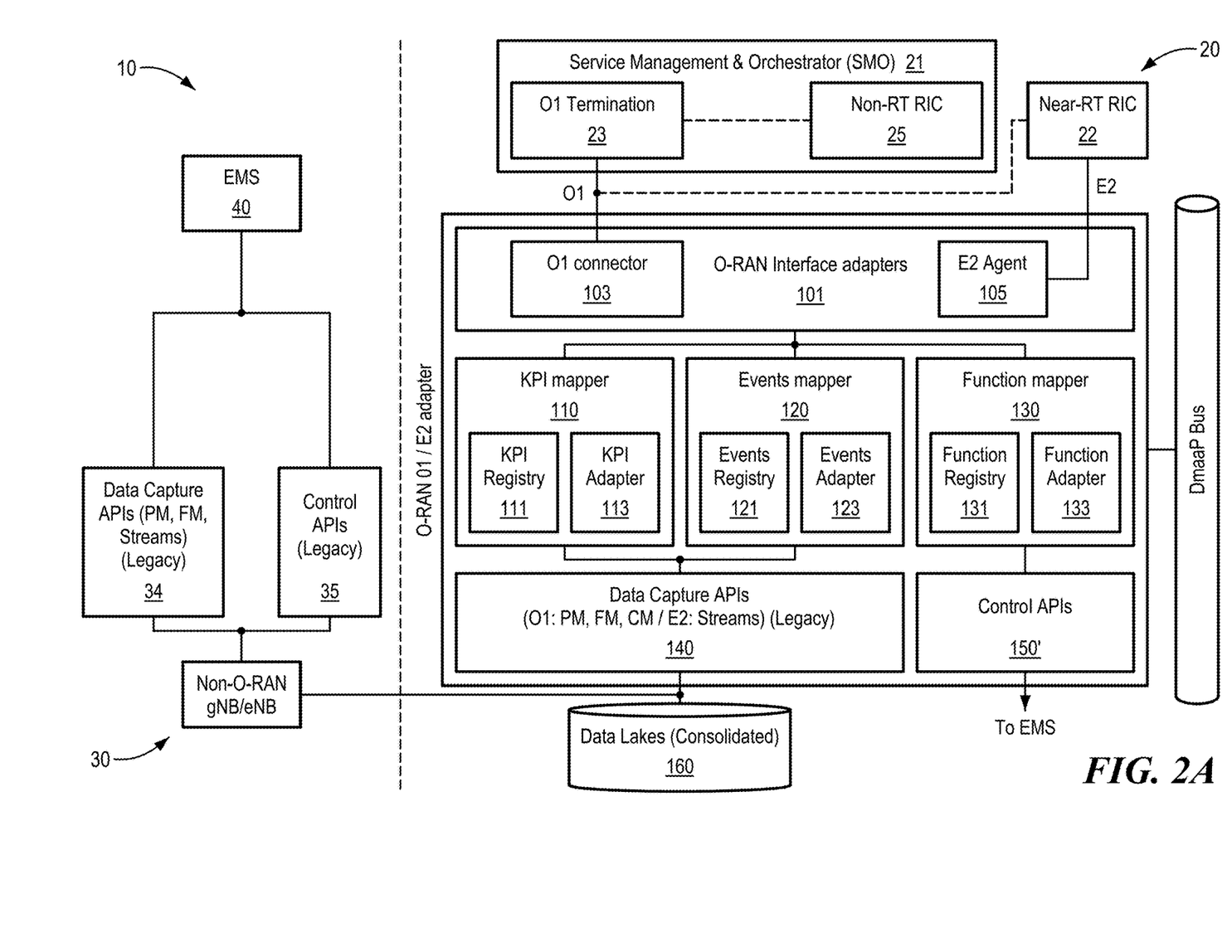
FIG. 2A illustrates a schematic diagram of a wireless network including an Open RAN adapter configured for EMS-based control of non-open RAN nodes in accordance with various embodiments.
Figure 2B:
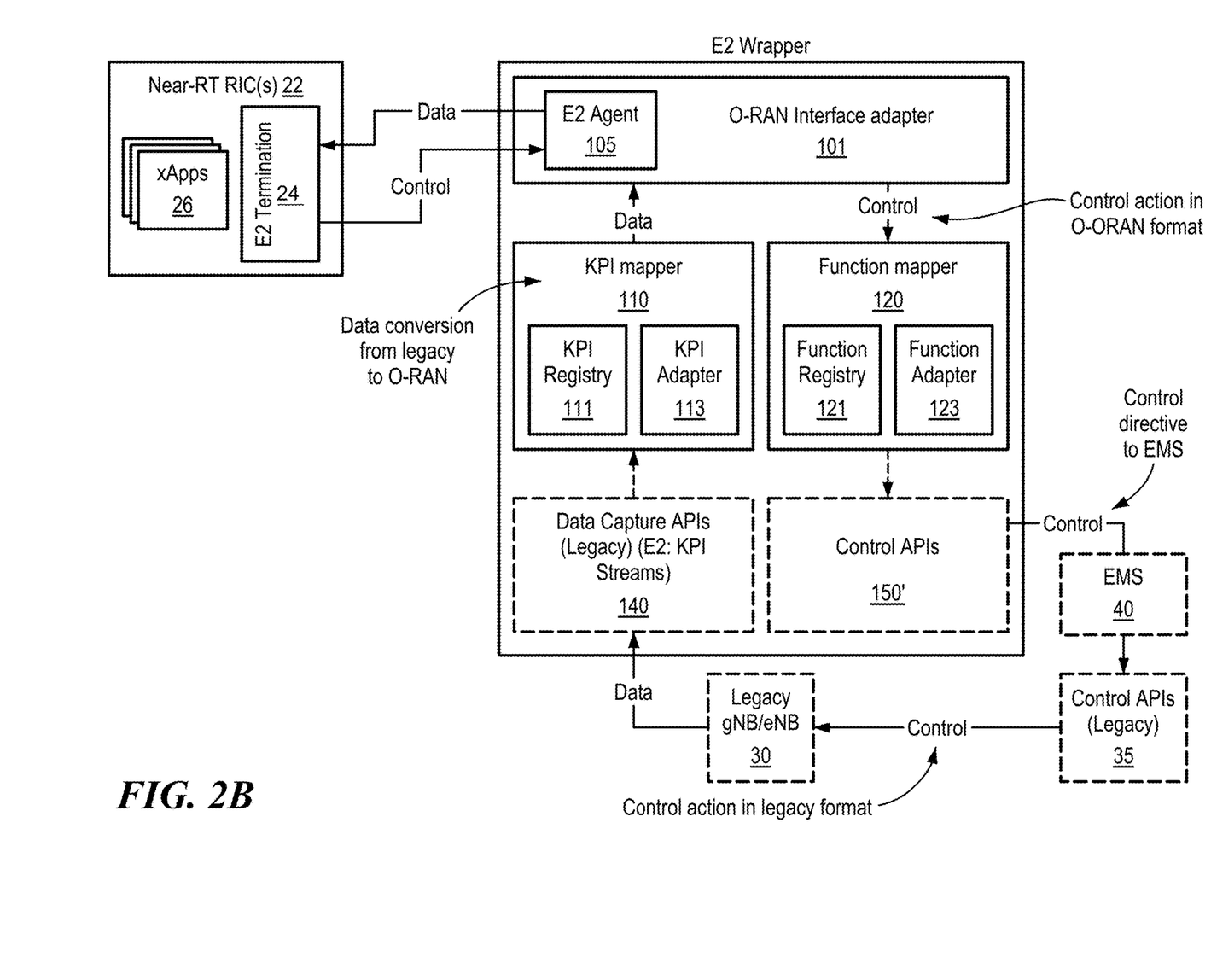
FIG. 2B illustrates a schematic diagram of E2 data flow in the wireless network of FIG. 2A.

As illustrated by comparing FIGS. 1A-1B with FIGS. 2A-2B, control functionality, particularly Control APIs 150, 150' of the Open RAN adapters 100, 100' can be reconfigurable to account for different non-open RAN (legacy) network deployments. For example, the Open RAN adapter 100 shown in FIGS. 1A-1B includes one or more Control APIs 150 associated with the non-open RAN node(s) 30 for interacting directly with the non-open RAN nodes 30. Such Control APIs 150 correspond to Control APIs 35 of each non-open RAN node 30 and are generally offered by a vendor of the respective non-open RAN node 30. The Control APIs 150 typically operate to monitor and reconfigure parameters of the non-open RAN nodes 30. In this case, the legacy Control APIs 35 of the non-open RAN nodes 30 can be accessed by the Control APIs 150 of the Open RAN adapters 100, which can use them to update non-open RAN node 30 (e.g., gNB/eNB) parameters in real-time according to decisions taken by the near-RT RICs 22 and/or non-RT RICs 25 via xApps 26 and rApps.

Alternatively, the Open RAN adapter 100 shown in FIGS. 2A-2B includes one or more EMS Control APIs 150' for sending control signals to an element management system (EMS) 40 corresponding to one or more non-open RAN nodes 30. The EMS 40, in turn, uses the legacy Control APIs 35 of corresponding non-open RAN nodes 30 to enforce the control action that traversed the Open RAN adapter 100. The control signals transmitted to the EMS, when executed by the non-open RAN nodes 30, typically operate to monitor and reconfigure parameters of the non-open RAN nodes 30. In this manner, the Open RAN adapters 100' can use the EMS 40 to update non-open RAN node 30 (e.g., gNB/eNB) parameters in real-time according to decisions taken by the near-RT RICs 22 and/or non-RT RICs 25 via xApps and rApps.

In addition, with respect to inputting commands for controlling the non-open RAN nodes 30, the Control APIs 150, 150' and/or the Open RAN adapter 100 more generally can be configured to interact, directly or indirectly, with a command line interface (CLI) of the non-open RAN nodes 30 to input commands into the non-open RAN nodes 30. Such direct or indirect interaction with the CLI can be employed regardless of whether the Control APIs 150, 150' are configured for direct interaction with Control APIs 35 of the non-open RAN nodes 30 or indirect interaction with the non-open RAN nodes 30 via the EMS 40.

As shown in both FIGS. 1A and 2A, in some embodiments, an optional consolidated data lake 160 can be provided, which can be used, for example, to continuously store data being generated by non-open RAN nodes 30. The data lake 160 can be accessed offline to perform data analytics or to train AI solutions via the O1 interface. In this case, the Data Capture APIs 140 of the Open RAN adapters 100, 100' are not directly connected to a non-open RAN node 30 (e.g., eNB/gNB), but to the data lake 160 by emulating access via the O1 interface.

Deployment Scenarios

Several adapter configurations can be used in accordance with various embodiments, as needed to tailor the Open RAN adapters to different network deployments and requirements. In particular, the Open RAN adapters can be tailored with respect to two configuration parameters: polymorphic configuration and location configuration. These two configuration parameters can be independently tailored in any suitable combination depending on the specific deployment scenario.

Polymorphic Configuration

Figure 3:
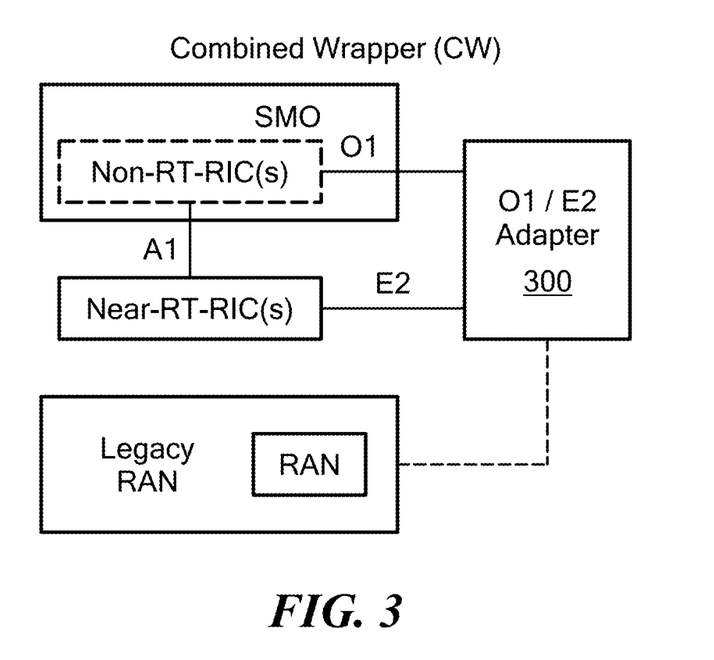
FIG. 3 is a schematic diagram of a combined wrapper Open RAN adapter in accordance with various embodiments.

As shown in FIGS. 1A, 2A, and 3, in some embodiments the Open RAN adapter can be configured in a "combined wrapper" format as an O1/E2 adapter 100, 100', 300 having both O1 and E2 interfaces. In this modality, the adapter includes both O1 connector and E2 agent and handles the adaptation of both interfaces at the same time and on the same software module.

Figure 4:
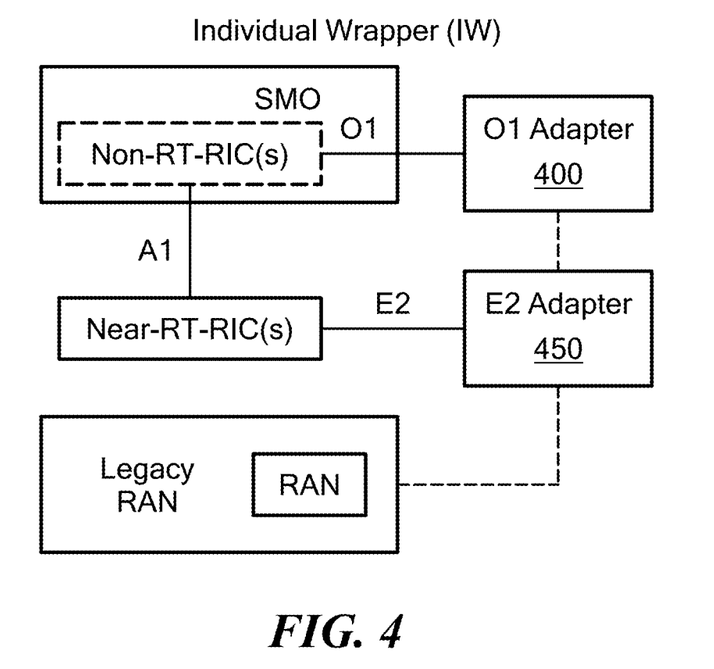
FIG. 4 is a schematic diagram of an individual wrapper Open RAN adapter in accordance with various embodiments.

Alternatively, as shown in FIG. 4, the Open RAN adapters can be configured in an individual wrapper format with an O1 adapter 400 and a separate E2 adapter 450. In this modality, each interface (either O1 or E2) is instantiated as an individual component, each handling either the E2 or O1 adaptation.

By providing flexibility in polymorphic configuration, resource allocation can be managed according to resource availability and/or non-open RAN network and/or node compatibility.

Location Configuration

Figure 5:
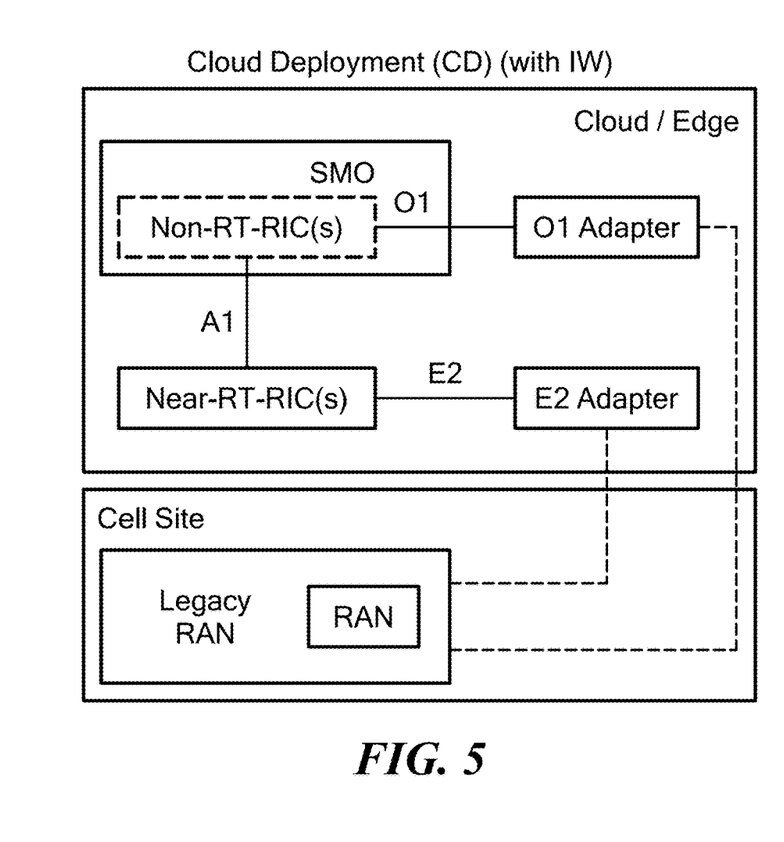
FIG. 5 is a schematic diagram of a cloud deployment of an Open RAN adapter in accordance with various embodiments.

As shown in FIG. 5, in some embodiments the Open RAN adapter (e.g., in an individual wrapper format as shown or in a combined wrapper format) can be deployed in the cloud (e.g., an edge cloud, a local cloud or on a cloud service). In such embodiments control may not be achievable in real time, thus experiencing comparative delay. However, in many instances an individual non-open RAN node (e.g., a cell site as shown) may lack the hardware resources to operate an Open RAN adapter and/or only be configured for external interface and control on a group basis in connection with other legacy RAN nodes. In such instances, such a cloud deployment is the only option for instantiating an Open RAN adapter and thus such cloud deployments can advantageously preserve at least some Open RAN functionality even with respect to legacy nodes with very low computational resourcing.

Figure 6:
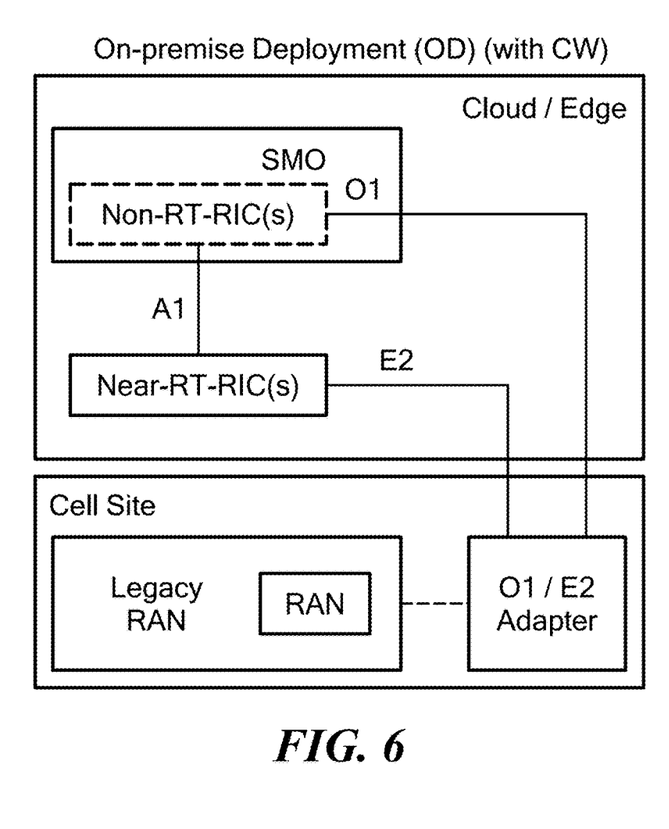
FIG. 6 is a schematic diagram of an on-premises deployment of an Open RAN adapter in accordance with various embodiments.

As shown in FIG. 6, in some embodiments the Open RAN adapter (e.g., in a combined wrapper format as shown or in an individual wrapper format) can be deployed on-premises at a non-open RAN node (e.g., a cell site as shown). When sufficient computing hardware is available at the non-open RAN node, such an on-premises deployment can advantageously facilitate real time control of the non-open RAN node.

Although the cloud deployment of FIG. 5 is shown having an individual wrapper configuration and the on-premises deployment of FIG. 6 is shown having a combined wrapper configuration, it should be understood that any cloud or on-premises configuration can be used in connection with any individual wrapper or combined wrapper configuration in accordance with various embodiments.

In some embodiments, a hybrid location deployment configuration can be employed in combination with an individual wrapper configuration. In such a hybrid configuration one of the O1 adapter or the E2 adapter can be deployed in the cloud and the other can be deployed on-premises. In such instances, it may be advantageous to deploy the O1 adapter (generally used for slower, non-RT communication with the SMO) in the cloud and to deploy the E2 adapter (generally used for more rapid, real time or near-RT communications) on-premises to facilitate real time control when faced with limited on-premises computing resources.

Example Novel Features of the Technology

1. The technology permits abstract legacy RAN nodes to operate as Open RAN nodes.
2. The technology provides a set of middleware software to convert KPIs, events and functionalities of the legacy RAN into a unified format that complies with Open RAN specifications.
3. The technology offers a modular approach where operators can select which adapters are needed (e.g., E2 only, O1 only, or both O1 and E2).

Example Advantages and Improvements Over Previous Technologies

1. The technology makes legacy RAN controllable by Open RAN RICs.

2. The technology facilitates the transition to Open RAN-only deployments, thus avoiding the need for expensive licenses for legacy SON frameworks.
3. The technology makes the utilization of Open RAN technologies possible immediately, thus speeding up the wide adoption of Open RAN technologies.
4. The present technology benefits wireless communications operators (both green and brown), as well as private 5G and beyond applications such as smart ports, industry 4.0, manufacturing, and many others.

While example embodiments have been particularly shown and described, it will be understood by those skilled in the art that various changes in form and details may be made therein without departing from the scope of the embodiments encompassed or contemplated herein.

As used herein, "consisting essentially of" allows the inclusion of materials or steps that do not materially affect the basic and novel characteristics of the claim. Any recitation herein of the term "comprising", particularly in a description of components of a composition or in a description of elements of a device, can be exchanged with "consisting essentially of" or "consisting of".

What is claimed is:

1. An open radio access network (Open RAN) adapter for using non-open RAN nodes in a wireless network having Open RAN infrastructure comprising:
    one or more control application programming interfaces (Control APIs) for controlling the non-open RAN nodes;
    one or more Data Capture APIs for capturing operational data from the non-open RAN nodes;
    one or more Open RAN interfaces for communication between the Open RAN adapter and the Open RAN infrastructure; and
    one or more mapping modules for translating data received via the Data Capture APIs to Open RAN compatible data for use by the Open RAN infrastructure and for translating Open RAN commands received via the Open RAN interfaces to non-open RAN compatible commands for instantiation at one or more of the non-open RAN nodes via the Control APIs wherein the one or more mapping modules includes:
        a key performance indicator (KPI) mapping module for converting KPI reports generated by the non-open RAN nodes to Open RAN KPI reports, the KPI mapping module including:
            a KPI adapter for determining a list of KPIs of at least one of the one or more non-open RAN nodes and mapping the determined list of KPIs of each corresponding non-open RAN node to a list of Open RAN KPIs; and
            a KPI registry configured to store each mapped list of Open RAN KPIs for each corresponding non-open RAN node.

2. The Open RAN adapter of claim 1, wherein the Open RAN infrastructure in communication with the Open RAN adapter via the Open RAN interfaces includes at least one of a near-real time (near-RT) RAN intelligent controller (RIC), a non-RT RIC, and/or a service management and orchestration platform (SMO) of the Open RAN.

3. The Open RAN adapter of claim 1, wherein the one or more mapping modules include a function mapping module for determining a list of available functionalities of at least one of the non-open RAN nodes.

4. The Open RAN adapter of claim 3, wherein the function mapping module includes:
    a function adapter for determining a list of functionalities of at least one of the one or more non-open RAN nodes and mapping the determined list of functionalities of each corresponding non-open RAN node to a list of Open RAN functionalities; and
    a function registry configured to store each mapped list of Open RAN functionalities for each corresponding non-open RAN node.

5. The Open RAN adapter of claim 4, wherein the functionalities each include at least one of a control functionality, a management functionality, a monitoring functionality, or combinations thereof.

6. The Open RAN adapter of claim 1, wherein the one or more mapping modules, along with the Control APIs, are configured to permit the Open RAN adapter to control the non-open RAN nodes to emulate the execution of one or more xApps and/or rApps.

7. The Open RAN adapter of claim 1, wherein the Open RAN adapter is configured to interact with one or more of the non-open RAN nodes at a control plane using Control APIs configured to directly interface with the one or more of the non-open RAN nodes.

8. The Open RAN adapter of claim 1, wherein the Open RAN adapter is configured to interact with one or more of the non-open RAN nodes at a control plane via an element management system (EMS) using Control APIs configured to interface with the EMS.

9. The Open RAN adapter of claim 8, wherein the EMS is configured to directly interface with the one or more of the non-open RAN nodes responsive to interaction with the Open RAN adapter.

10. The Open RAN adapter of claim 1, wherein the Open RAN adapter is configured to access data of one or more of the non-open RAN nodes and/or input commands into one or more of the non-open RAN nodes via direct or indirect interaction with a command line interface of at least one of the non-open RAN nodes.

11. The Open RAN adapter of claim 1, further comprising a data lake, accessible by the Data Capture APIs, configured to continuously store data generated by the non-open RAN nodes.

12. The Open RAN adapter of claim 1, wherein the one or more Open RAN interfaces are configured to permit the Open RAN adapter to emulate at least one of an E2 interface, an O1 interface, or combinations thereof.

13. The Open RAN adapter of claim 12, wherein the one or more Open RAN interfaces include one Open RAN interface configured to emulate both the E2 interface and the O1 interface.

14. The Open RAN adapter of claim 12, wherein the one or more Open RAN interfaces include:
    a first Open RAN interface configured to emulate the E2 interface; and
    a second Open RAN interface configured to emulate the O1 interface.

15. The Open RAN adapter of claim 1, wherein the Open RAN adapter is deployed in a cloud.

16. The Open RAN adapter of claim 15, wherein the cloud includes at least one of an edge cloud, a local cloud, a cloud service, or combinations thereof.

17. The Open RAN adapter of claim 1, wherein the Open RAN adapter is deployed at a cell site corresponding to the one or more non-open RAN nodes.

18. The Open RAN adapter of claim 1, wherein the one or more mapping modules include an event mapping module for converting event reports generated by the non-open RAN nodes to Open RAN event reports.

19. The Open RAN adapter of claim 18, wherein the event mapping module includes:
- an event adapter for determining a list of event reports of at least one of the one or more non-open RAN nodes and mapping the determined list of event reports of each corresponding non-open RAN node to a list of Open RAN event reports; and
- an event report registry configured to store each mapped list of Open RAN event reports for each corresponding non-open RAN node.

20. A wireless network comprising:
- an open radio access network (Open RAN) infrastructure;
- one or more non-open RAN nodes; and
- an Open RAN adapter for using the non-open RAN nodes in the wireless network, the Open RAN adapter including:
  - one or more control application programming interfaces (Control APIs) for controlling the non-open RAN nodes;
  - one or more Data Capture APIs for capturing operational data from the non-open RAN nodes;
  - one or more Open RAN interfaces for communication between the Open RAN adapter and the Open RAN infrastructure; and
  - one or more mapping modules for translating data received via the Data Capture APIs to Open RAN compatible data for use by the Open RAN infrastructure and for translating Open RAN commands received via the Open RAN interfaces to non-open RAN compatible commands for instantiation at one or more of the non-open RAN nodes via the Control APIs, wherein the one or more mapping modules includes:
    - a key performance indicator (KPI) mapping module for converting KPI reports generated by the non-open RAN nodes to Open RAN KPI reports, the KPI mapping module including:
      - a KPI adapter for determining a list of KPIs of at least one of the one or more non-open RAN nodes and mapping the determined list of KPIs of each corresponding non-open RAN node to a list of Open RAN KPIs; and
      - a KPI registry configured to store each mapped list of Open RAN KPIs for each corresponding non-open RAN node.

* * * * *